(12) United States Patent
Knoblauch

(10) Patent No.: US 9,145,065 B2
(45) Date of Patent: Sep. 29, 2015

(54) MOTOR VEHICLE WITH AN ELECTRICAL ENERGY STORAGE AND POWER ELECTRONICS

(71) Applicant: Dr. Ing. h.c. F. Porsche Aktiengesellschaft, Stuttgart (DE)

(72) Inventor: Daniel Knoblauch, Obergruppenbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/135,712

(22) Filed: Dec. 20, 2013

(65) Prior Publication Data
US 2015/0175030 A1    Jun. 25, 2015

(30) Foreign Application Priority Data

Dec. 21, 2012    (DE) ................ 10 2012 112 970 U

(51) Int. Cl.
*B60K 1/04*    (2006.01)
*B60L 11/18*   (2006.01)
*B60R 16/02*   (2006.01)

(52) U.S. Cl.
CPC ............. *B60L 11/1877* (2013.01); *B60R 16/02* (2013.01)

(58) Field of Classification Search
USPC ........................... 180/68.5, 291, 232
See application file for complete search history.

(56) References Cited

U.S. PATENT DOCUMENTS

| | | | | |
|---|---|---|---|---|
| 4,153,127 | A * | 5/1979 | Klink et al. ................. 180/65.1 |
| 5,392,873 | A * | 2/1995 | Masuyama et al. .......... 180/68.5 |
| 6,784,538 | B2 * | 8/2004 | Nakamura et al. ............ 257/707 |
| 7,177,153 | B2 * | 2/2007 | Radosevich et al. ......... 361/699 |
| 8,336,607 | B2 * | 12/2012 | Abadia et al. ................. 165/80.3 |
| 8,556,011 | B2 * | 10/2013 | Anwar et al. ............. 180/65.275 |
| 8,662,225 | B2 * | 3/2014 | Masfarud et al. ............ 180/68.5 |
| 8,848,375 | B2 * | 9/2014 | Rai et al. ........................ 361/716 |
| 8,857,543 | B2 * | 10/2014 | Ebert et al. ................. 180/65.21 |
| 2008/0156549 | A1 * | 7/2008 | Leboe et al. ................. 180/65.1 |
| 2011/0315464 | A1 * | 12/2011 | Yokoyama et al. .......... 180/68.5 |
| 2012/0312612 | A1 * | 12/2012 | Harrison et al. ............. 180/68.5 |

* cited by examiner

*Primary Examiner* — John Walters
*Assistant Examiner* — Brian Swenson
(74) *Attorney, Agent, or Firm* — Gerald E. Hespos; Michael J. Porco; Matthew T. Hespos

(57) ABSTRACT

A motor vehicle has a structure (1) for accommodating an electrical energy storage means and having power electronics (2) for an electric machine of the motor vehicle. In such a motor vehicle, there is provision according to the invention that the power electronics (2) are integrated into the structure (1). Such a vehicle is defined by a small installation space requirement, a low weight and a low degree of expenditure on assembly.

12 Claims, 3 Drawing Sheets

* # MOTOR VEHICLE WITH AN ELECTRICAL ENERGY STORAGE AND POWER ELECTRONICS

CROSS REFERENCE TO RELATED APPLICATION

This application claims priority under 35 USC 119 to German Patent Appl. No. 10 2012 112 970.3 filed on Dec. 21, 2012, the entire disclosure of which is incorporated herein by reference.

BACKGROUND

1. Field of the Invention

The invention relates to a motor vehicle having a structure for accommodating an electrical energy storage and having power electronics for an electric machine of the motor vehicle.

2. Description of the Related Art

Motor vehicles that can be driven electrically are known in a wide variety of configurations. For example, electric machines can be operated as a motor and/or generator. The motor vehicles are equipped with an electrical energy storage, such as a high-voltage battery.

The structure for accommodating the electrical energy storage and the power electronics for the electric machine of the motor vehicle are arranged in different regions of the motor vehicle. This causes an extremely large amount of installation space to be required and gives rise to an extremely high level of complexity of assembly since two modules, specifically the structure and the power electronics, have to be mounted. The separate modules additionally increase the weight of the motor vehicle.

The object of the invention is to provide a motor vehicle where the structure for accommodating the electrical energy storage and power electronics for the electric machine of the motor vehicle have a small installation space requirement, a low weight and a low level of complexity of assembly.

SUMMARY OF THE INVENTION

According to the invention the electrical energy storage and the power electronics for the electric machine of the motor vehicle are in a module. The installation space requirement of the arrangement of the structure and the power electronics therefore is reduced significantly and the module can be assembled with a significantly reduced expenditure. Weight also is reduced since only one module is required.

The integration of power electronics into the module reduces the number of interfaces and thereby number of cables, thereby reducing weight and cost.

The structure of the invention preferably has a frame and a housing for accommodating the electrical energy storage. The housing preferably has two housing lids. One housing lid preferably is mounted in an upper region of the frame, and the other housing lid preferably is mounted in an underside region of the frame. In particular, the frame has an opening penetrated by the energy storage means mounted in the frame.

The frame preferably supports the energy storage. The housing lids cover upper and lower sides of the energy storage. Housing lids can be connected easily to the frame due to the configuration of the structure with the frame. As a result, an enclosed structure completely surrounds the energy storage.

The frame preferably is a component of an auxiliary frame in the bodywork of the vehicle. The auxiliary frame preferably connects longitudinal members and crossmembers for wheels of an axle of the motor vehicle.

The frame may have a carrying function and accordingly is suitable for accommodating the electrical energy storage. The frame embodied as a ring enables an optimum force distribution to be influenced in the structure, the frame or the ring.

The frame or the ring preferably is composed of fiber-reinforced plastic, as a particularly lightweight solution, or of diecast aluminum, which permits a cost-effective solution with good thermal conductivity.

The energy storage preferably is a high-voltage battery.

The power electronics are preferably have a high-voltage section and a low-voltage section. The high-voltage section is also referred to as a high-voltage side of the power electronics, and the low-voltage section as the low-voltage side of the power electronics.

The power electronics preferably have at least one cooling section connected to the frame.

The power electronics can be integrated physically into the structure in a wide variety of ways.

The power electronics preferably have a cooling section arranged between the high-voltage section and the low-voltage section. Preferably either the high-voltage section is arranged above the cooling section and the low-voltage section below the cooling section or the low-voltage section is arranged above the cooling section and the high-voltage section below the cooling section. The two sections—the high-voltage section and the low-voltage section—therefore are assigned to the same cooling section. Alternatively, the power electronics can have two cooling sections connected to the frame, with the high-voltage section connected to the one cooling section and the low-voltage section to the other cooling section. In this case, the sections relating to the high voltage and the low voltage are assigned to different cooling sections.

The respective cooling section may be let into the frame.

The invention therefore proposes power electronics that are not arranged remotely from the structure for accommodating the electrical energy storage means but instead the structure and the power electronics form one module. The power electronics are attached here to the structure or are seated partially in the structure, for example when the respective cooling section is integrated into the frame.

The respective cooling section preferably is a cooling panel, and therefore has an extremely large heat-transfer surface.

The frame and the power electronics preferably have a cooling means with a common cooling circuit. Thus, the power electronics and the energy storage means can be cooled by the same cooling circuit. Both the cooling section of the power electronics and the frame have suitable openings for cooling medium flows.

Further features of the invention can be found in the appended drawing and the description of the preferred exemplary embodiments represented in the drawing, without being restricted thereto.

DETAILED DESCRIPTION OF THE PREFERRED EMBODIMENTS

Figure 1:
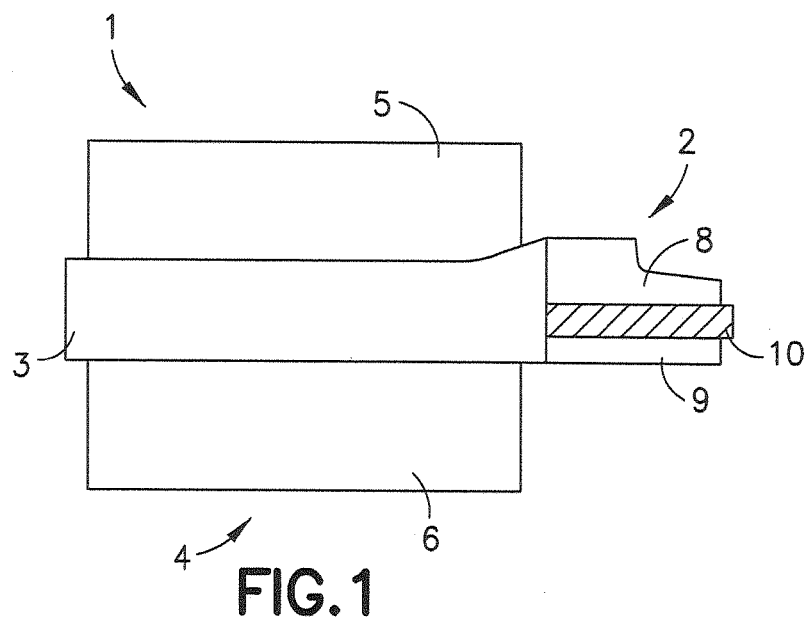
FIG. 1 shows, for a first exemplary embodiment of the invention for use in a motor vehicle embodied as a passenger car, an arrangement of a structure for accommodating an electrical energy storage means and of power electronics for an electric machine of the motor vehicle, illustrated in a side view.

FIGS. 1 to 6 illustrate a structure 1 for accommodating an electrical energy storage means, in addition power electronics 2 for an electric machine of the motor vehicle. The motor vehicle or the passenger car is not illustrated as such but instead only the region of the structure 1 and the power electronics 2. The electric machine of the motor vehicle is preferably embodied in such a way that it can be operated both as an electric motor for driving the motor vehicle and as an electric generator for braking the motor vehicle in the generator mode. The electrical energy storage means of the motor vehicle is a high-voltage battery. The motor vehicle is driven with the latter. If, on the other hand, the motor vehicle is braked, the energy storage means is charged using the generator mode of the electric machine.

Accordingly, in all three embodiments illustrated in FIGS. 1 to 6, the power electronics 2 are integrated into the structure 1.

The embodiments illustrate the structure 1 which has a frame 3 and a housing 4 for accommodating the electrical energy storage means. The housing 4 has two housing lids 5 and 6. The housing lid 5 is mounted in the frame 3 in the region of the upper side thereof and the housing lid 6 is mounted in the frame 3 in the region of the underside thereof.

The frame 3 is of rectangular design, with in this case a substantially constant wall thickness of the frame 3, and has an opening 7. The energy storage means (not illustrated) which is mounted in the frame 3 penetrates said opening 7.

The power electronics 2 have a high-voltage section 8 and a low-voltage section 9. In addition, the power electronics 2 have at least one cooling section 10 which is connected to the frame 3.

Figure 2:
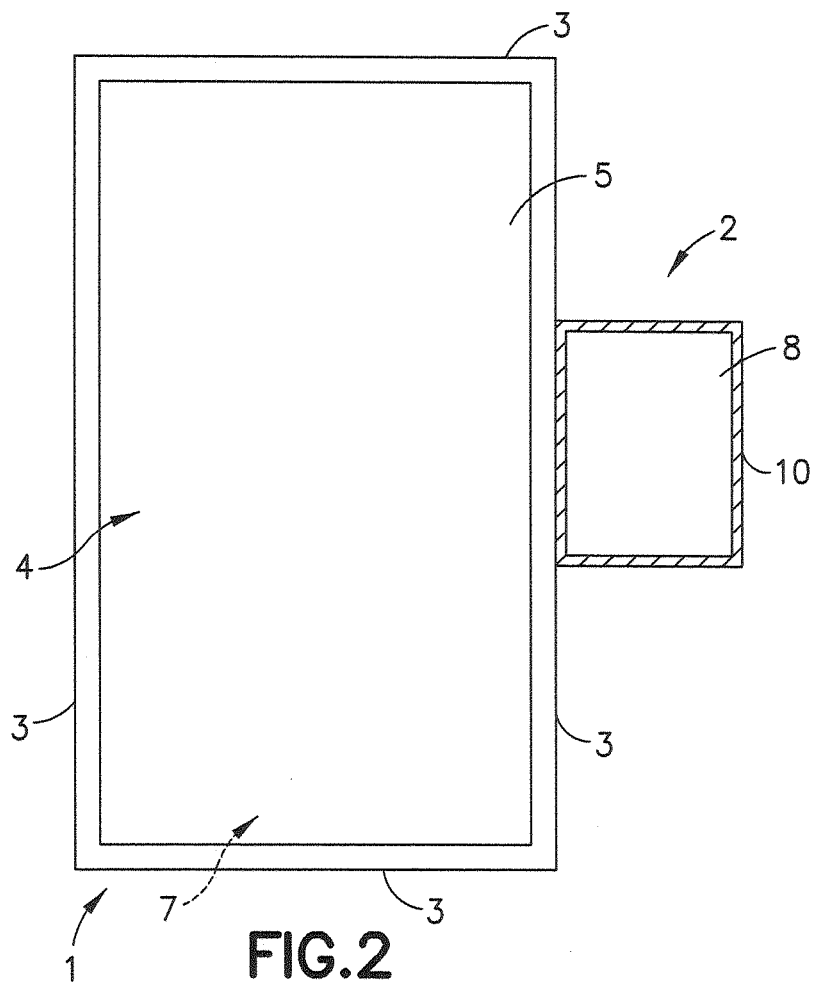
FIG. 2. shows a plan view of the arrangement according to FIG. 1.

With respect to the embodiment according to FIGS. 1 and 2, the power electronics 2 are embodied in such a way that they have a single cooling section 10 which is arranged between the high-voltage section 8 and the low-voltage section 9. In this context, the high-voltage section 8 is arranged above the horizontally arranged cooling section 10, and the low-voltage section 9 is arranged below this cooling section 10.

Figure 3:
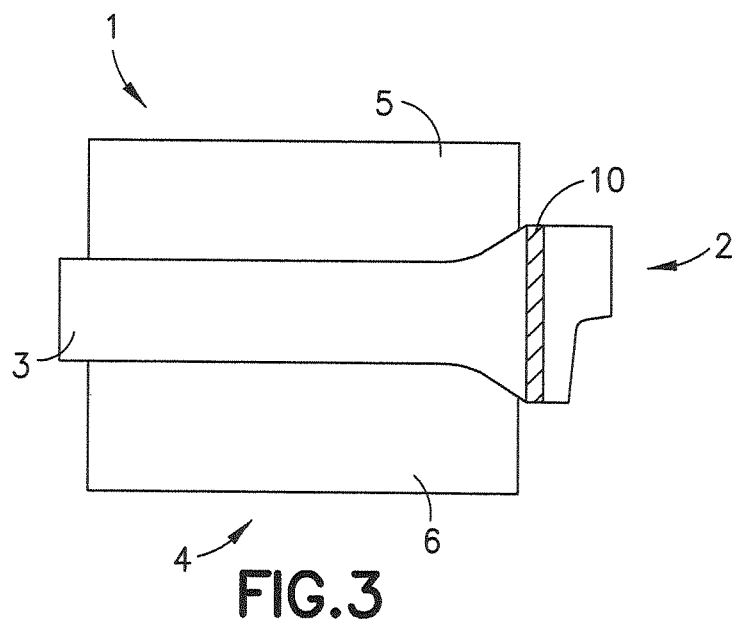
FIG. 3 shows, for a second exemplary embodiment of the invention, an arrangement of the structure and of the power electronics which is modified compared to the first exemplary embodiment, illustrated in a side view.
Figure 4:
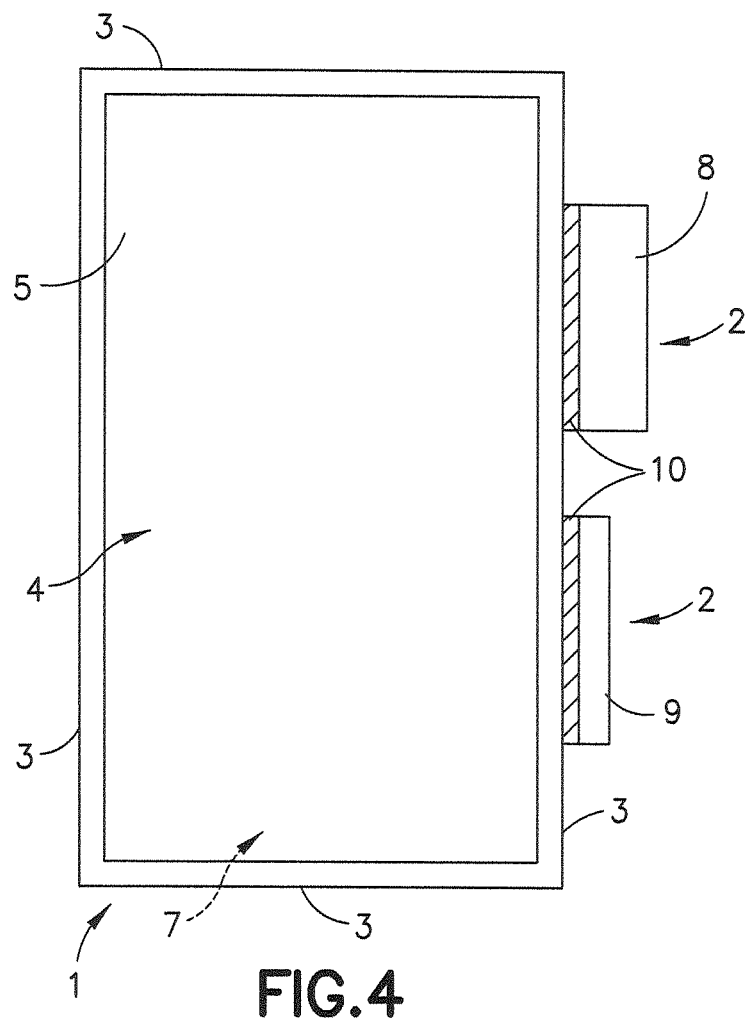
FIG. 4 shows a plan view of the arrangement according to FIG. 3.

In contrast, in the embodiment according to FIGS. 3 and 4, the power electronics 2 have two cooling sections 10. The latter are connected to the frame 3. The high-voltage section 8 is connected to the one cooling section 10, and the low-voltage section 9 to the other cooling section 10. The two cooling sections 10 with the assigned sections 8 and 9 are arranged one next to the other, with the result that the one cooling section 10 is positioned closer to the one side of the vehicle and the other cooling section 10 is positioned closer to the other side of the vehicle.

Figure 5:
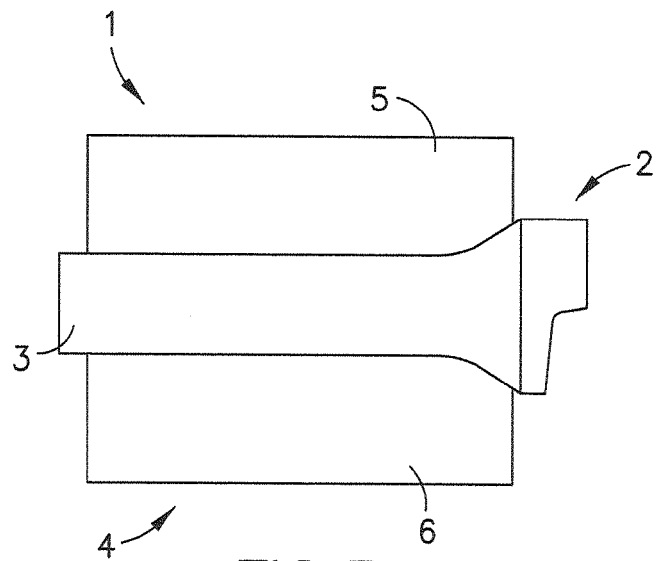
FIG. 5 shows, for a third exemplary embodiment of the invention, an arrangement of the structure and of the power electronics which is modified compared to the first exemplary embodiment, illustrated in a side view.
Figure 6:
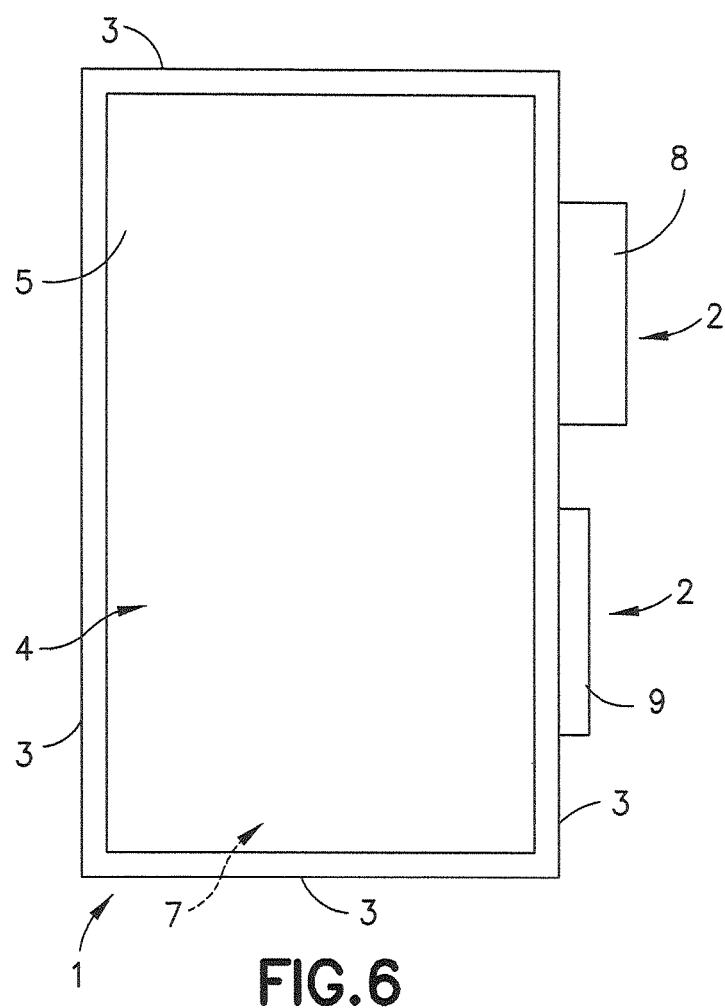
FIG. 6 shows a plan view of the arrangement according to FIG. 5.

The embodiment which is illustrated in FIGS. 5 and 6 differs from that according to FIGS. 3 and 4 in that the respective cooling section 10 is let into the frame 3.

The cooling section 10 which is described with respect to the embodiments is preferably embodied as a cooling panel.

The fact that the structure 1, in particular power electronics 2 and the frame 3, have a cooling means with a common cooling circuit is not illustrated in detail.

The structure 1 is, in particular, a component of an auxiliary frame in the bodywork of the motor vehicle. The auxiliary frame serves here to connect longitudinal members and crossmembers for wheels of an axle of the motor vehicle.

The structure 1 therefore has a frame for accommodating the electrical energy storage means or a loadable structure for accommodating the electrical energy storage means or the battery.

What is claimed is:

1. A motor vehicle having a structure for accommodating an electrical energy storage and having power electronics for an electric machine of the motor vehicle, that the structure comprising:
    a frame having opposite top and bottom ends and an opening penetrating through the frame from the top end to the bottom end, the frame defining a ring extending around an outer periphery of the electrical energy storage and supporting the electrical energy storage in the vehicle;
    upper and lower lids being mounted to the frame and enclosing the electrical energy storage from the top and bottom;
    the power electronics being integrated into the structure and mounted to an external surface of one wall of the frame; and
    a cooling section mounted to the external surface of the wall of the frame and positioned adjacent the power electronics.

2. The motor vehicle of claim 1, wherein the frame has an opening penetrated by the energy storage means mounted in the frame.

3. The motor vehicle of claim 1, wherein the energy storage means is a high-voltage battery.

4. The motor vehicle of claim 1, wherein the power electronics have a high-voltage section and a low-voltage section.

5. The motor vehicle of claim 4, wherein the cooling section is arranged between the high-voltage section and the low-voltage section.

6. The motor vehicle of claim 5, wherein either the high-voltage section is arranged above the cooling section and the low-voltage section below the cooling section or the low-voltage section is arranged above the cooling section and the high-voltage section below the cooling section.

7. The motor vehicle of claim 4, wherein the power electronics have two cooling sections connected to the frame, the high-voltage section is connected to one cooling section and the low-voltage section to the other cooling section.

8. The motor vehicle of claim 1, wherein the cooling section is let into the frame for cooling the electrical energy storage around which the frame extends.

9. The motor vehicle of claim 1, wherein the respective cooling section is a cooling panel.

10. The motor vehicle of claim 1, wherein the structure and the power electronics have a common cooling circuit.

11. The motor vehicle of claim 1, wherein the frame is made of fiber-reinforced plastic.

12. The motor vehicle of claim 1, wherein the frame is made of die cast aluminum.

\* \* \* \* \*